Sept. 20, 1971 H. LICHTMAN 3,606,113
REMOVING WASTE FROM A MOLDED ARTICLE
Filed Jan. 26, 1970 3 Sheets-Sheet 1

FIG. I

INVENTORS.
HOWARD LICHTMAN
LAWRENCE A. MARTINO
BY Michael J. Murphy
ATTORNEY:

Sept. 20, 1971     H. LICHTMAN     3,606,113
REMOVING WASTE FROM A MOLDED ARTICLE
Filed Jan. 26, 1970     3 Sheets-Sheet 2

INVENTORS.
HOWARD LICHTMAN
LAWRENCE A. MARTINO
BY *Michael J. Murphy*
ATTORNEY:

United States Patent Office 3,606,113
Patented Sept. 20, 1971

3,606,113
REMOVING WASTE FROM A MOLDED ARTICLE
Howard Lichtman, Windsor, Conn., and Lawrence A. Martino, Trenton, N.J., assignors to Monsanto Company, St. Louis, Mo.
Filed Jan. 26, 1970, Ser. No. 5,681
Int. Cl. B26f 3/00
U.S. Cl. 225—1                        7 Claims

ABSTRACT OF THE DISCLOSURE

A projecting, fin-like waste tail, preferably made of a relatively stiff thermoplastic, is detached from the base of a molded article along a thin interconnecting web by a method which involves striking the tail with a curved surface moving toward the base to deflect the tail along the advancing surface and cause a limited surface portion of the tail to contact the base. Continued movement of the advancing surface breaks the tail away from the base along the web about the limited surface portion which acts as a fulcrum during separation. The apparatus includes a reciprocally mounted specially rounded striking surface.

BACKGROUND OF THE INVENTION

This invention relates to removal of waste plastic from a molded article and more particularly to removal of a fin-like tail from the bottom of a blow molded container after ejection from the mold.

As an incidental part of blow molding articles from materials such as thermoplastics, a waste tail or fin-like projection is usually formed between the mating sections of the mold during closing. This tail portion is jointed to the article by a web formed between opposing pinch lands of the mold sections, and which is desirably kept as thin as possible in order to facilitate removal along the web.

Many approaches are known in the prior art for detaching this fin-like tail from the formed article. Some involve removing the tail while in the mold or during ejection of the formed article from the mold. However, these techniques usually require a separate tail removing means associated with each mold, and consequently this approach is quite costly for a high volume production installation. In addition, tail removal with this approach undesirably consumes a concrete portion of mold cycle time which could otherwise be devoted to forming the article.

An alternate, more attractive generic approach toward tail removal is to provide one or more separate high speed article trimming stations downstream of the molding installation which have adequate capacity to handle the combined output of a plurality of molds and which function independently of the molding operation. It is this type of system with which the present invention is concerned.

Prior art approaches to ex-mold tail trimming have generally involved means acting in a plane perpendicular to the projecting tail. These approaches are unreliable, however, to the extent that the still warm tail tends to fold over and become welded to the adjoining surface of the article before it can be removed, which, of course, requires manual repositioning before detailing. When the plastic is a relatively stiff material, such as polymeric vinyl chloride or styrene, the surface of the article, because of the nature of the material, has a crazed appearance after prying the tail away. In addition, besides being in an upright position, the tail with these approaches must also be horizontally and vertically oriented with respect to the detailing apparatus and this likewise usually requires manual attention.

SUMMARY OF THE INVENTION

Now there has been discovered a unique method and means for detailing molded plastic articles which avoids the aforementioned prior art difficulties.

Accordingly, it is an object of this invention to provide an improved method and apparatus for detailing molded plastic articles after removal from the forming molds.

Another object of this invention is to provide an improved method and apparatus of the aforementioned variety which is specifically adapted to accommodate relatively stiff thermoplastic materials.

A further object of this invention is to provide an improved method and apparatus for removing a tail from a molded article regardless of the position of the tail with respect of the adjoining article surface or of the vertical position and/or directional orientation of the tail with respect to the means for detaching the tail.

An additional object of this invention is to provide an improved method and apparatus of the aforementioned variety which will detach a tail from a blow molded container of any cross section without requiring any special initial orientation of the tail.

Other objects of this invention will in part be obvious and will in part appear hereinafter.

These and other objects are accomplished by providing a method of separating a projecting, fin-like, waste tail from the base of a molded article along an interconnecting web, the tail, base and web preferably being made of a relatively stiff plastic material, the method comprising the steps of positioning the projecting tail opposite a rounded striking surface and rapidly advancing the rounded surface toward the tail in a direction generally perpendicular to the base of the article to strike and cause the tail to deflect laterally as the surface approaches the base due to pivotal movement of the tail about the web, the advancement continuing after a limited surface portion of the tail is forced against the base so as to break the tail away from the base along the web and about the limited surface portion. The tail preferably has at least one supporting nub formed on either side and extending between the tail and the base to prop the tail away from the base prior to removal.

The apparatus includes a rounded impulse surface for exerting a sudden, force on the tail to separate the tail from the base along the web, means for securing the article with the attached tail opposite the striking surface, and means operatively connected to the rounded surface for rapidly vertically reciprocating the surface into and out of contact with the tail. The rounded impulse surface has a radius of curvature of between ½ to 2 inches in order for the apparatus to function effectively when the article being detailed is a container of conventional size.

BRIEF DESCRIPTION OF THE DRAWINGS

In describing the overall invention, reference will be made to the accompanying drawings wherein.

DETAILED DESCRIPTION OF THE INVENTION

Figure 1:
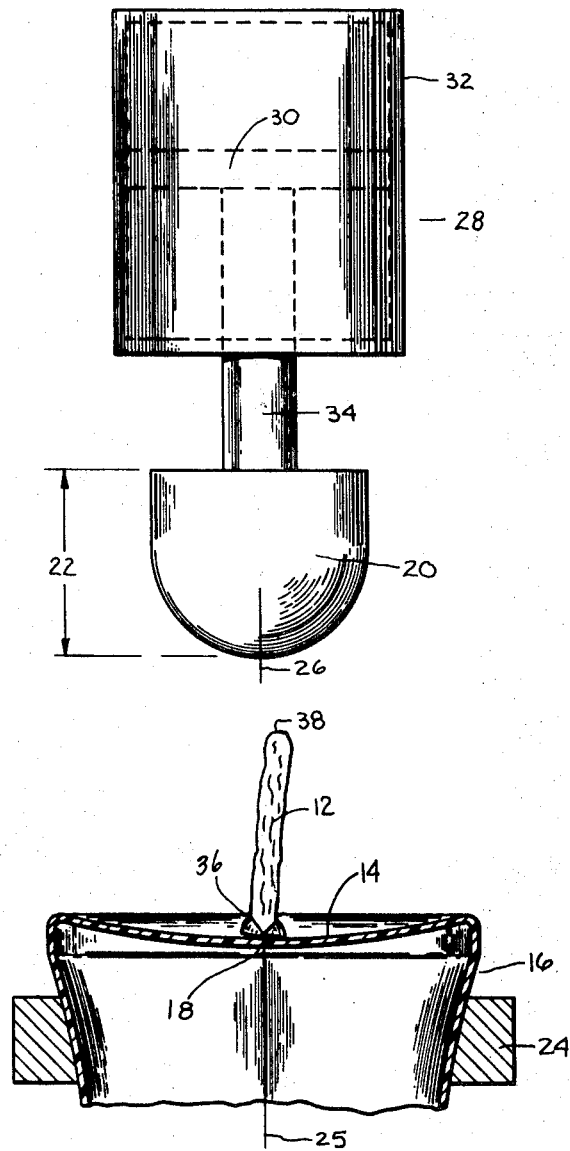
FIG. 1 is a schematic, elevational view of the apparatus of the present invention prior to initiation of the detailing step.

Referring now to the drawings, there is shown in FIG. 1, a detailing station generally indicated as 10 which comprises apparatus for removing projecting, fin-like waste tail 12 from the base 14 of a molded article 16, such as a bottle. Removal is along thin interconnecting web 18 which extends horizontally across base 14 between tail 12 and base 14. Web 18 is formed when vertically short compressing edges or pinch lands on each half of a conventional blow mold close on each other with hot, moldable thermoplastic trapped therebetween during the blow molding operation.

The illustrated apparatus includes a rounded impulse surface 20 which is hemispherical in surface contour at its lower end, having a radius of curvature on the order of ¾ inch. Surface 20 in the illustrated embodiment happens to have a vertical height 22 on the order of 1¼ inches. Means such as clamp 24 are provided for securing article 16 and attached tail 12 in place opposite striking surface 20. The center of surface 20, indicated as 26, is positioned opposite the vertical axis 25 of article 16. Axis is herein meant to mean the central line about which a body having either a cylindrical or non-cylindrical cross section turns. However, as an attractive feature of the invention, the spherical end of surface 20 may be positioned opposite the web joining the tail to the container anywhere along the horizontal length of the web. In other words, the system is operative as long as surface 20 comes into contact with some part of tail 12 on moving downwardly, as will be further described hereinafter. Means 28 are provided which are operatively connected to rounded surface 20, for example by means of a conventional threaded connection in the upper end thereof. These means 28 are adapted to rapidly, vertically reciprocate surface 20 into and out of contact with tail 12, and may comprise a fluid operated piston 30 within piston housing 32 which is connected by means of shaft 34 to surface 20.

Figure 2:
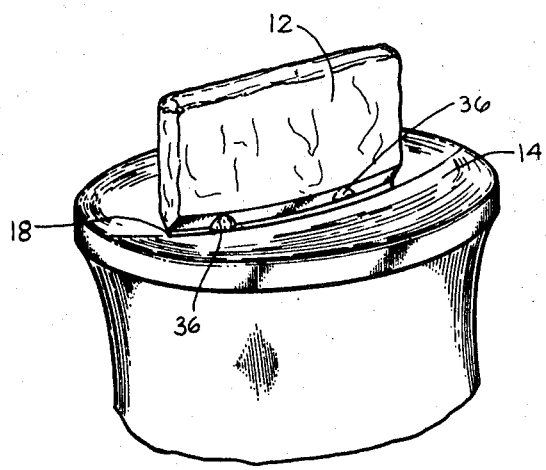
FIG. 2 is an enlarged, partial perspective view of the article and the attached tail depicted in FIG. 1.
Figure 3:
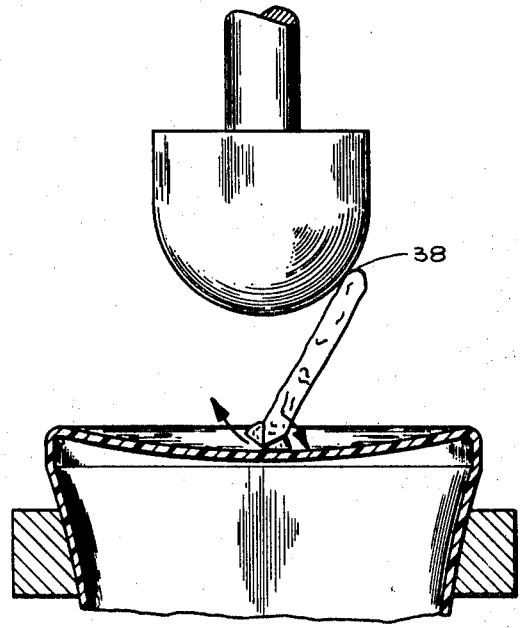
FIG. 3 is a view similar to FIG. 1 illustrating the position of the tail with respect to the article just after detachment from the article.

In the particular form of the invention depicted in FIGS. 1–3, tail 12 is supported in a vertical or substantially vertical position by means of one nub 36 situated on either side of tail 12 close to the vertical ends thereof, as depicted in FIG. 2, and extending between tail 12 and base 14. These nubs serve to prop tail 12 away from base 14, and their formation during mold closing is more particularly described in copending application Ser. No. 5,682, filed, and assigned to the assignee of the present invention.

Tail 12 and consequently article 16 are preferably made of a relatively stiff thermoplastic material such as a polymer of styrene containing at least 30% by weight of polymerized styrene monomer, the remainder being thermoplastic polymer(s) interpolymerized with the styrene.

In operation, reciprocatively mounted piston 30 is caused to move rapidly in a direction substantially perpendicular to base 14 by conventional fluid drive means introduced to housing 32, such that rounded surface 20 strikes the free end 38 of tail 12. Surface 20 is reciprocated such that the striking force on tail 12 is on the order of 75 lbs. and the advancing movement of surface 20 is at a rate on the order of 2 inches per second. This sudden force applied to the relatively stiff tail 12 by rounded surface 20 pushes either one of nubs 36, depending on the particular side toward which tail 12 is tilting, against base 14 about web 18, which causes the other nub to move incrementally away from base 14. Thus, the nub which is being forced against base 14 serves as a fulcrum whereas the other does not. The force exerted by the continuously advancing surface 20 then causes tail 12 in this embodiment to progressively rip away from base 14 beginning at the end of web 18 whereat the fulcrum serving nub 36 is located, since the stress is greatest on the web portion immediately adjacent the fulcrum, and extending to the other end without any substantial bending of tail 12 with respect to itself. As depicted in FIG. 3, nub 36 on the lower side of the falling tail is the fulcrum about which the applied force of the advancing surface acts to overcome the resisting force of web 18 tending to keep tail 12 attached to base 14. During the initial portion of the downward movement of surface 20, tail 12 deflects laterally along rounded surface 20, as indicated in FIG. 3, as a result of its pivotal movement about web 18 as surface 20 approaches base 14. The final portion of the advancing movement after a limited surface portion of tail 12, which in this embodiment is nub 36, is forced against base 14 causes tail 12 to separate from the base along web 18 about this limited surface portion. Means such as a shroud connected to a suitable conventional source of reduced pressure and having an open end surrounding the area where the tail is snapped away may be used to convey the removed waste tail portions to a suitable recovery area. After completion of the downward stroke to remove tail 12, piston 30 is caused to reciprocate upwardly, detailed container 16 is removed from the tail removal station 10 and another article positioned in its place in station 10 for the start of the next cycle.

Figure 4:
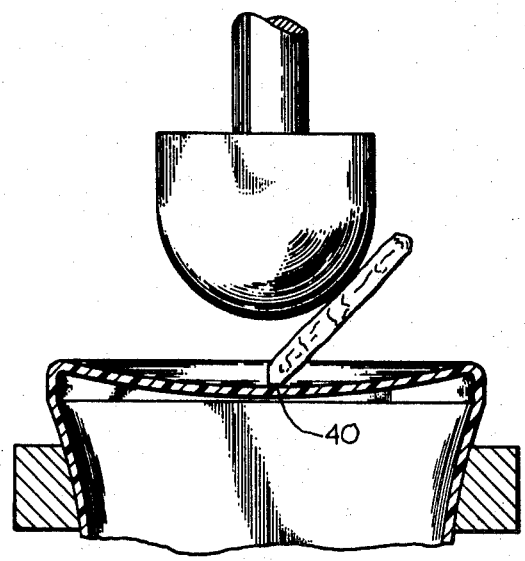
FIGS. 4 and 5 are views similar to FIG. 3 wherein the shape of the tail fastened to the article surface as well as the length of the interconnecting web is slightly different from that depicted in FIGS. 1–3.

In the embodiment of FIG. 4, nubs 36 are eliminated, and the limited surface portion of the tail forced against the base about which the remainder of the tail pivots as it is being broken away from the base comprises surface or face 40 angularly oriented with respect to the sides of the tail immediately adjacent the interconnecting web, and which is formed between cooperating surfaces of the mold exterior of the body forming cavity during mold closing. In this embodiment the tail breaks away simultaneously and relatively evenly along the interconnecting web which web is similar to that depicted in FIGS. 1–3.

Figure 5:
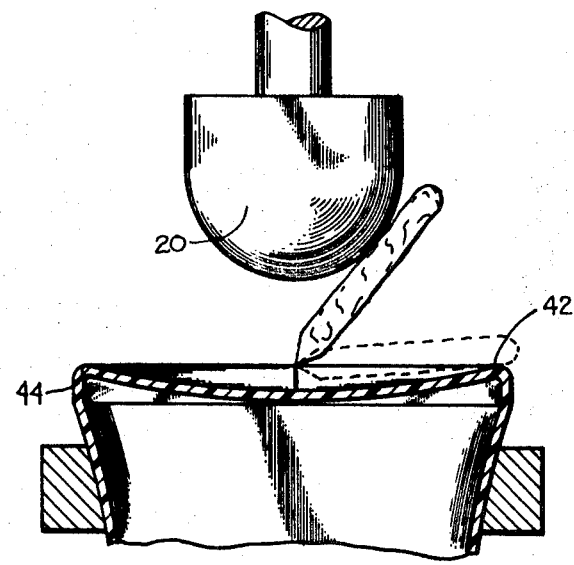

In the embodiment of FIG. 5, the limited surface portion of the tail about which it pivots during separation from the article comprises surface 42 on one side of and adjacent the free end of the tail, which cooperates with standing ring 44 at the periphery of the bottle base during pivotal movement of the tail as a result of the striking force imparted by surface 20. The dotted outline of the tail in FIG. 5 illustrates its position in contact with ring 44 after having been deflected by the striking surface. As is apparent from FIG. 5, the web attaching the tail to the bottle base is slightly longer than in the other embodiments.

The above description and particularly the drawings are set forth for purposes of illustration only and are not to be taken in a limited sense.

The present invention is most successful when an impulse type of force is exerted against the tail being removed. In other words, the force acting on the tail should be relatively high and the time during which it acts should be short, otherwise the stretch characteristics of the thermosplastic will be brought out and the snapping or ripping action along the interconnecting web will not effectively occur. In this sense, the force exerted by the striking surface should be between 50 to 100 lbs. and the surface should be moving at a rate of between 1 to 5 inches per second.

The function of the striking surface of the invention is (1) to deflect the tail laterally to one side so as to bring a limited surface fulcrum acting portion of the tail into contact with the base of the molded article, and (2) to exert an applied force on the tail which, in conjunction with the limited surface portion of the tail already in contact with the base, overcomes the resisting force of the web tending to keep the tail attached to the article base. To accomplish the first function, the portion of the striking surface which initially contacts the tail must have have a rounded contour in order that the tail be deflected to one side or the other, as opposed to becoming wedged against the leading end of the impulse surface, which can occur when the striking surface is a flat plate or has an insufficient rounded contour. In the latter instance, the tail could be driven against the base with such force that the base of the container could be pushed into its interior. It should be realized, however, that though the leading end of the striking surface must be rounded, the remainder need not necessarily be rounded. When the articles are blow molded thermoplastic containers of conventional size, satisfactory results are obtained preferably with a hemispherical striking surface contour wherein the radius of curvature $r$ is equal to ¼ of the smallest dimension of the adjoining article wall. For example, for a cylindrical container, $r$ should be equal to ¼ times the base diameter, whereas for an oblong container, $r$ should equal ¼ times the dimension of the minor axis. For most conventional sized containers, $r$ is between ½ to 2 inches.

If the length of the web interconnecting the tail to the base of the article is sufficiently short and thin, and the action of the striking surface is sufficiently great in terms of force, and sudden in terms of contact time, the invention may be used with any type of thermoplastic material, i.e., the relatively pliant thermoplastics such as polyethylene and polypropylene as well as the stiffer and more rigid thermoplastics. However, it is difficult to consistently maintain such a web with a given set of mold sections since the lands or web forming surfaces tend to wear and become flat or greater in vertical length after repeated closings. The invention, therefore, is particularly and preferably applicable to relatively stiff thermoplastics such as polymers and/or copolymers of vinyl chloride and styrene, wherein the weakness of the web is not of particular concern since little or no stretching of the web occurs as the tail is broken off. These relatively stiff thermoplastics are characterized herein as those having a flexural modulus in excess of 190,000 p.s.i.

The detailing technique of the present invention eliminates the need of having the tail in an exact vertical position immediately before removal, since even if the tail is partially tilted toward the base the downward stroke of the detailing means will still effectively break it away. Similarly, the directional orientation of the tail is unimportant when the present detailing system is incorporated, for example, into a rotating table deflashing system, since the means for removing the tail operates in a direction perpendicular to the surface to which the tail is attached or generally parallel rather than perpendicular to the planar faces of the tail itself. Likewise, the vertical position of the container and tail are not critical as in prior art systems since one stroke of the piston attached to the tail removing striking surface may accommodate a range of different sized containers. The length of this stroke, if necessary, may be conveniently changed without difficulty to accommodate another range of container sizes.

It will be understood that many variations and modifications of the embodiments herein described will be obvious to those skilled in the art, and may be carried out without departing from the spirit and scope of the invention as hereinafter claimed.

What is claimed is:

1. A method of separating a projecting, fin-like, waste tail from the base of a molded article along an interconnecting web comprising the steps of:

(a) positioning said projecting tail opposite a rounded striking surface; and
(b) rapidly advancing said rounded surface toward said tail in a direction generally perpendicular to the base of the article to strike and cause said tail to deflect laterally as said surface approaches the base due to pivotal movement of the tail about the web, said advancement continuing after a limited surface portion of the tail is forced against the base so as to break the tail away from the base along the web and about said limited surface portion.

2. The process of claim 1 wherein the rounded surface during its advancing movement travels at a rate of between 1 to 5 inches per second and exerts a striking force on the tail of between 50 to 100 pounds.

3. The process of claim 1 wherein the tail is made of a relatively stiff plastic material characterized as having a flexural modulus in excess of 190,000 p.s.i.

4. The process of claim 1 wherein the limited surface portion of the tail is an angular face immediately adjacent the interconnecting web.

5. The process of claim 3 wherein the plastic is a thermoplastic polymer comprising at least 30% by weight of polymerized styrene monomer with the remaining material being a thermoplastic polymer interpolymerized with the styrene monomer.

6. A method of detaching a fin-like, waste tail connected to the base of a molded article along a thin web and propped away from the base by means of a least one supporting nub on either side of the tail extending between the tail and the base, said tail being made of a relatively stiff plastic material, said method comprising the step of striking the free end of said tail with a rounded surface moving in a direction substantially perpendicular to the base whereby the sudden force applied to said relatively stiff tail by the rounded surface progressively rips the tail away from the base beginning at one end of the web and extending to the other end thereof without any substantial bending of the tail with respect to itself, the nub on one side of the tail acting as a fulcrum about which the applied striking force acts to overcome the resisting force of the web tending to keep the tail attached to the base.

7. The process of claim 6 wherein the plastic is a polyvinyl chloride polymer.

References Cited

UNITED STATES PATENTS

| | | | |
|---|---|---|---|
| 2,280,204 | 4/1942 | Tracy | 225—103X |
| 3,428,231 | 2/1969 | Bundus | 225—103X |
| 3,465,931 | 9/1969 | Rupert | 225—1 |
| 3,486,190 | 12/1969 | Waechter et al. | 225/103X |
| 3,506,171 | 4/1970 | Rupert | 225—103X |

FOREIGN PATENTS

| | | | |
|---|---|---|---|
| 233,486 | 4/1911 | Germany | 225—103 |

FRANK T. YOST, Primary Examiner

U.S. Cl. X.R.

18—5BS; 83—914; 225—103